April 12, 1932. C. E. BREADEN 1,853,198

SCALE PLATFORM

Filed Feb. 6, 1930

Inventor
Carroll E. Breaden
By his Attorney
W M Wilson

Patented Apr. 12, 1932

1,853,198

UNITED STATES PATENT OFFICE

CARROLL E. BREADEN, OF DAYTON, OHIO, ASSIGNOR TO DAYTON SCALE COMPANY, OF DAYTON, OHIO, A CORPORATION OF NEW JERSEY

SCALE PLATFORM

Application filed February 6, 1930. Serial No. 423,340.

This case relates to weighing scales and particularly to the platform structures thereof.

In parcel post or air mail service, it is necessary to determine the dimensions of the package to be shipped as well as the weight of the package.

The object of the present invention is to provide means for obtaining the dimensions of a package while it is being weighed.

More specifically, the object of the invention is to provide a weighing scale platform for locating and measuring a package while it is being weighed on the platform.

Another object is to provide a hinged extension support for packages on the platform.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

Figure 1:
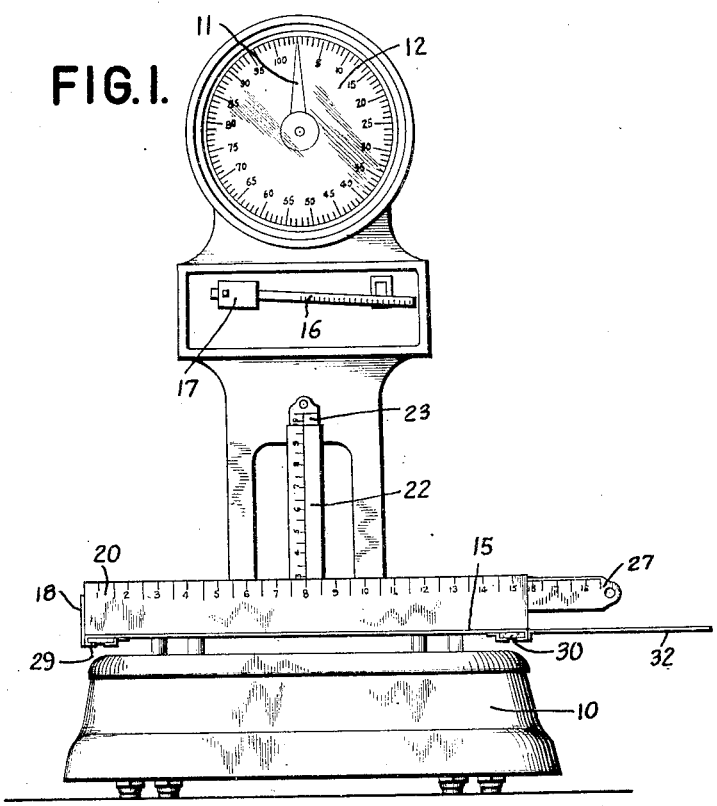
Fig. 1 is a front view of the scale provided with the novel platform.
Figure 2:
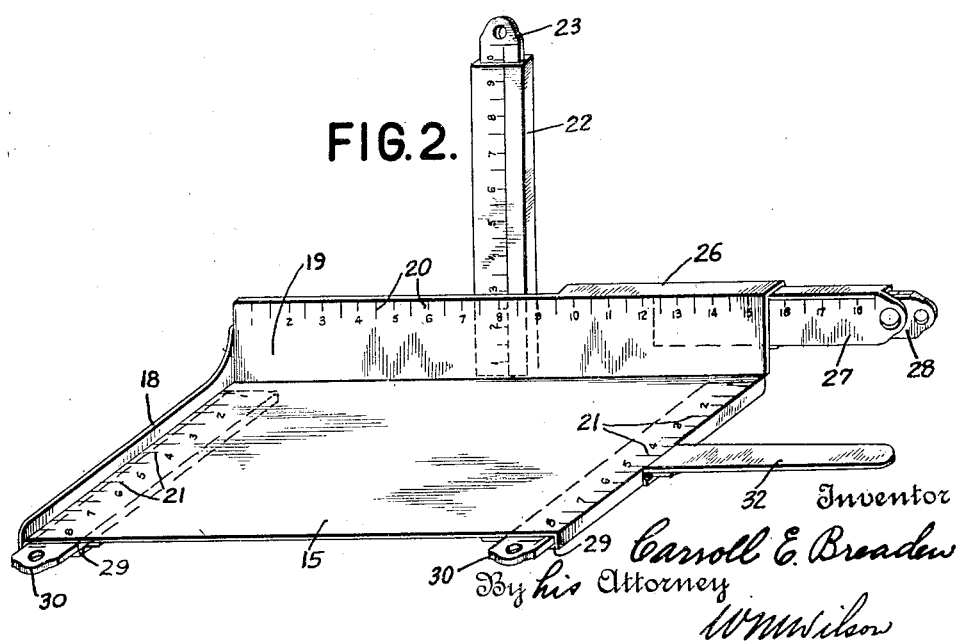
Fig. 2 is a detail view of the platform.

In detail, the scale comprises the base 10 containing the base levers (not shown) connected through any suitable weighing connections to a counterbalancing mechanism for actuating the pointer 11 to indicate on dial 12 the weight of an object on the platform 15. The scale is also provided with the usual capacity beam 16 and poise 17.

The platform 15 is of sheet metal and is provided on two adjacent sides thereof with upstanding walls 18 and 19 against both of which a package may be set when it is placed on the platform to be weighed. This locates the package so that its dimensions for all practical purposes may be effectively ascertained.

Wall 19 is bent up integral with the base or horizontal portion of the platform. A measuring means comprising a linear scale 20 is marked on the front of wall 19 and parallel and similar linear scales 21 at right angles to scale 20 are marked on the base or horizontal surface of the platform.

The back of wall 19 has fixed thereto a vertical graduated member 22 which is channeled to provide a guideway for a ruler 23.

The back of wall 19 is also integrally formed with a channeled portion 26 to guide a horizontal extension ruler 27 prolonging scale 20 and in ruler 27 is slidable a second ruler 28 prolonging the scale on ruler 27.

The base of the platform is folded under at both sides to form channeled portions 29, each having therein an extension ruler 30 prolonging the adjacent scale 21. Thus the length of a package may be ascertained by rulers 19, 27 and 28; the width of a package by rulers 21 and 30; and the height of a package by rulers 22 and 23.

Hinged to the side of platform 15 opposite wall 18 is an extension member 32 to help support extremely long and heavy packages.

Rulers 23, 27, 28, and 30 may also be utilized as extension supports for a package of large dimensions.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

1. A weighing scale platform comprising a base, a pair of intersecting walls upstanding from the base, linear scales provided on said platform for measuring the horizontal dimensions of the sides of an object engaged with both walls, and a measuring device extending upwardly from said base and having a linear scale to measure the height of the object.

2. A weighing scale platform including a base, a measuring member carried by the base and extensible therefrom in a horizontal direction, and a measuring member carried by the platform and extensible in a direction at right angles to said first-mentioned measuring member.

3. A weighing scale platform comprising a base, a measuring member carried by the base and extensible therefrom in a horizontal direction, and abutment means for locating a package on the base to be measured by said measuring member.

4. A weighing scale platform comprising a base provided with channeled portions at an angle to each other and rulers slidably guided in said portions for measuring an object resting on said base.

5. A weighing scale platform comprising a base having an integral channeled portion, and a ruler guided in said portion for measuring an object on the base.

6. A weighing scale platform comprising a base having a channel, a ruler guided in said channel for measuring an object on the base, and an abutment for positioning the object while being measured.

7. A weighing scale platform comprising a base having a plurality of guiding devices extending at an angle to each other and rulers movable on said devices to measure a package on the base.

8. A weighing scale platform comprising a base, an abutment for an object upstanding therefrom, a channeled portion provided on said abutment, and a ruler guided in said portion for measuring said object.

9. The invention as described in claim 8, said abutment comprising a wall bent up integrally from the base and said channeled portion being integrally formed with the wall.

10. A scale platform comprising a base and means for helping support an object on the base extending beyond two sides thereof, said means comprising a member slidably carried by the base and extensible outwardly from one of said sides and a member hinged to the base and movable outwardly beyond the other side.

11. A scale platform comprising a base, measuring means provided on the base for an object resting on the base, and a member movable outwardly from a side of the base to partially support an object on the base extending beyond said side of the base.

12. A scale platform comprising a base and a member hinged to the base adjacent one side thereof and movable outwardly from said side to partially support an object on the base extending beyond said side of the base.

13. A weighing scale platform comprising a sheet metal base having an integrally bent up vertical wall folded over at the top to form a channel, and a measuring member guided in said channel for measuring an object on the base.

In testimony whereof I hereto affix my signature.

CARROLL E. BREADEN.